(12) United States Patent
Oh et al.

(10) Patent No.: US 11,614,539 B2
(45) Date of Patent: Mar. 28, 2023

(54) APPARATUS AND METHOD FOR REMOVING NOISE FOR OBSERVATION INFORMATION OF WEATHER RADAR

(71) Applicant: Korea Meteorological Administration, Seoul (KR)

(72) Inventors: Young-A Oh, Seoul (KR); Hae Lim Kim, Seoul (KR); Mi-Kyung Suk, Seoul (KR)

(73) Assignee: Korea Meteorological Administration, Seoul (KR)

( * ) Notice: Subject to any disclaimer, the term of this patent is extended or adjusted under 35 U.S.C. 154(b) by 64 days.

(21) Appl. No.: 17/232,490

(22) Filed: Apr. 16, 2021

(65) Prior Publication Data
US 2021/0382170 A1    Dec. 9, 2021

(30) Foreign Application Priority Data

Jun. 9, 2020 (KR) .................. 10-2020-0069554

(51) Int. Cl.
*G01S 13/95* (2006.01)
*G01S 7/292* (2006.01)

(52) U.S. Cl.
CPC ............ *G01S 13/958* (2013.01); *G01S 7/292* (2013.01); *G01S 13/951* (2013.01)

(58) Field of Classification Search
CPC ...... G01S 13/958; G01S 7/292; G01S 13/951; G01S 13/20; G01S 13/95; G01S 7/4052; G01S 7/418; G01S 13/953; G01S 7/414; G01S 13/5244; G01S 13/89; G01S 7/411; Y02A 90/10
See application file for complete search history.

(56) References Cited

FOREIGN PATENT DOCUMENTS

KR    100922130 B1  * 10/2009
KR    101730572 B1  *  4/2017

* cited by examiner

*Primary Examiner* — Erin F Heard
*Assistant Examiner* — Juliana Cross
(74) *Attorney, Agent, or Firm* — Rabin & Berdo, P.C.

(57) ABSTRACT

Provided are an apparatus and a method for removing noise for observation information of a weather radar, and more particularly, an apparatus and a method for removing noise for observation information of a weather radar capable of separating and removing second trip echoes corresponding to noise from precipitation echoes by simulating the reflectivity of the second trip echoes caused by a distance folding phenomenon shown in weather observation information generated using a weather radar. According to the present invention, in order to remove the second trip echo that occurs in the observation information measured in the volume observation radius during weather observation by setting the weather radar as the volume observation radius where the second trip echo occurs, the weather radar is set as a long-range observation radius in which a second trip echo exceeding the volume viewing radius does not occur.

9 Claims, 9 Drawing Sheets

(a) (b) (c) (d)

APPARATUS AND METHOD FOR REMOVING NOISE FOR OBSERVATION INFORMATION OF WEATHER RADAR

CROSS-REFERENCE TO RELATED APPLICATIONS

This application claims the priority of Korean Patent Application No. 10-2020-0069554 filed on Jun. 9, 2020, in the Korean Intellectual Property Office, the disclosure of which is incorporated herein by reference.

BACKGROUND OF THE INVENTION

Field of the Invention

The present invention relates to an apparatus and a method for removing noise for observation information of a weather radar, and more particularly, to an apparatus and a method for removing noise for observation information of a weather radar capable of identifying and removing second trip echoes corresponding to noise from precipitation echoes by simulating the reflectivity of the second trip echoes caused by a distance folding phenomenon shown in weather observation information generated using a weather radar.

Description of the Related Art

A weather radar (hereinafter referred to as a radar) is a device of measuring average reflection strength and location of a target in a sampling volume through reception power and reception time of a signal reflected on the target, such as rain or snow particles (hydrometeors) and returning by transmitting an electromagnetic wave (pulse or radar beam).

The radar may observe a three-dimensional (volume) state of the atmosphere in the form of polar coordination by observing the antenna by changing an azimuth angle from 0° to 360° and an altitude angle from 0° to 90°.

A maximum observation radius (hereinafter referred to as an observation radius) of the radar depends on a maximum reception time of the radar beam set during observation, and the longer the observation radius is, the longer the reception time is. Accordingly, there is a dilemma that the time interval (time resolution) of volume observation data becomes longer, and as a result, the volume observation radius of a large radar (S band) is usually set around 200 km.

At this time, a signal reflected from a target farther than the set volume observation radius is processed as a second trip echo which is a fake signal obtained by subtracting the observation radius from an actual location (distance) of the target as illustrated in FIG. 1 by the 'distance folding' phenomenon received together with a next transmission signal.

At this time, as the distance from the radar increases due to an Earth's curvature effect, the height of the radar beam increases, and the second trip echo is shown when there is a precipitation echo at the corresponding altitude outside the observation radius. If the observation radius is large enough, the second trip echo is not shown because the beam altitude is higher than the upper end of the precipitation echo (in the atmosphere (about 10 km), more than 15 km in the presence of a strong ascending air current). However, at the size of the volume observation radius set during normal volume observation, the second trip echo is frequently shown during observation at a low altitude angle (1.5° or less).

Since the characteristic of such a second trip echo is similar to the precipitation due to the actual precipitation signal, it is difficult to be completely distinguished in a double polarization characteristic or signal processing step, the accuracy of the radar-based output is deteriorated.

The above-described technical configuration is the background art for assisting the understanding of the present invention, and does not mean a conventional technology widely known in the art to which the present invention belongs.

SUMMARY OF THE INVENTION

An object of the present invention is to improve accuracy of observation information measured in a volume observation radius by simulating a second trip echo shown in a general volume observation radius based on observation information measured in a sufficient long-range observation radius in which the second trip echo is not shown by using a weather radar to remove an echo corresponding to the simulation echo as noise from the observation information measured in the volume observation radius.

Further, another object of the present invention is to greatly improve measurement accuracy of a weather radar while maintaining measurement efficiency of the weather radar in a volume observation radius, by removing second trip echoes generated at upper and lower altitudes (angles) as well as the same altitude (angle) as long-range observation from observation information measured in a volume observation radius to increase the accuracy to be similar to observation information measured in a long-range observation radius, when the long-range observation is performed at a single altitude angle.

According to an aspect of the present invention, there is provided an apparatus for removing noise for observation information of a weather radar, the apparatus including: a setting unit for setting an observation radius of the weather radar; an observation information generation unit that generates first observation information based on a signal received from the weather radar with a set volume observation radius according to setting of the observation radius of the weather radar by the setting unit and generates second observation information based on a signal received from the weather radar in which a long-range observation radius exceeding the volume observation radius is set; a simulation unit that generates a simulation echo by applying a predetermined simulation algorithm for each observation echo out of the volume observation radius in the second observation information to simulate a second trip echo corresponding to the observation echo of the second observation information; and a control unit that determines and removes the observation echo corresponding to the simulation echo among the one or more observation echoes included in the first observation information as noise based on the simulation echo simulated through the simulation unit.

In an embodiment of the present invention, the observation echo and the second trip echo each may consist of data including reflectivity and a location.

In an embodiment of the present invention, the control unit may compare the reflectivity between a specific simulation echo simulated at a specific location and a specific observation echo corresponding to the specific location in the second observation information, perform determination of the second trip echo in which the specific observation echo is determined as the second trip echo when the reflectivity of the specific simulation echo is greater than the reflectivity of the specific observation echo, calculate a performance result by performing the determination of the second trip echo for each of the one or more simulation echoes received from the simulation unit, and remove noise from the first observation information based on the simulation echo included in the performance result.

In an embodiment of the present invention, the apparatus may further include an output unit that outputs at least one of the first observation information and the second observation information, wherein the control unit may output and displays the first observation information from which the noise has been removed through the output unit.

In an embodiment of the present invention, the long-range observation radius may be a radius in which a second trip echo is not shown or which is double the volume observation radius.

In an embodiment of the present invention, the simulation algorithm includes first to fourth Equations,
the first Equation is $$P_r = c\frac{z}{r^2},$$

wherein, c represents a radar constant, z represents reflectivity, $P_r$ represent reception power, and r represents an observation distance,
the second Equation is $$P_r \propto \tau,$$

wherein, $P_r$ represents reception power, and $\tau$ represents a pulse width,
the third Equation is $$dBZ_{Folding}(r_{Folding}) = 10\log_{10}\left[10^{(dBZ_{Folded}(r_{Folded}))/10.0} \times \frac{\tau_{Folding}}{\tau_{Folded}} \times \frac{r^2_{Folding}}{r^2_{Folded}}\right],$$

wherein $dBZ_{Folding}$ represents simulation reflectivity, $r_{Folding}$ represents a distance to be simulated, $\tau_{Folding}$ represents a simulated pulse width, $r_{Folded}$ represents a long-range observation radius, $dBZ_{Folded}$ represents reflectivity at the long-range observation radius, and $\tau_{Folded}$ represents a pulse width of the radio wave in the long-range observation radius,
the fourth Equation is Simulated true location(actual location)=
$r + r_{ambiguous} + r_{Blind}$, wherein $r_{ambiguous}$ represents a maximum reception distance of the simulation setting and $r_{Blind}$ represents a reception blank due to transmission in the simulation setting.

In an embodiment of the present invention, the apparatus may further include a storage unit that pre-stores a vertical profile obtained by modeling a plurality of different altitude angles that are changed in a vertical direction whenever the altitude angle of the weather radar is changed and changes in reflectivity between the plurality of different altitude angles corresponding thereto, wherein the control unit may correct reflectivity for each of the plurality of different altitudes for each of the observation echoes out of the volume observation radius in the second observation information for each different altitude angle according to the vertical profile to calculate one or more correction echoes in which the reflectivity is corrected for each altitude, apply each of the one or more correction echoes obtained corresponding to a specific observation echo to the simulation algorithm through the simulation unit by interlocking with the simulation unit to generate one or more simulation echoes corresponding to each of the one or more correction echoes, and then remove noise from the first observation information based on the one or more generated simulation echoes.

In an embodiment of the present invention, the control unit may alternately set the volume observation radius and the long-range observation radius in the weather radar through the setting unit, generate first observation information corresponding to the volume observation radius and second observation information corresponding to the long-range observation radius at a predetermined period to match each other, control the simulation unit to identify first observation information matched at the same period with second observation information corresponding to the simulation echo generated by the simulation unit, and remove noise from the identified first observation information based on the simulation echo.

According to another aspect of the present invention, there is provided a method for removing noise for observation information of a weather radar in a noise removal apparatus, the method including the steps of: generating first observation information based on a signal received from the weather radar by setting an observation radius of the weather radar as a predetermined volume observation radius; generating second observation information based on a signal received from the weather radar by setting the observation radius of the weather radar as a predetermined long-range observation radius exceeding the volume observation radius; generating a simulation echo by applying a predetermined simulation algorithm for each observation echo out of the volume observation radius in the second observation information to simulate a second trip echo corresponding to the observation echo of the second observation information; and determining and removing the observation echo corresponding to the simulation echo among the one or more observation echoes included in the first observation information as noise based on the simulation echo.

According to the present invention, in order to remove the second trip echo that occurs in the observation information measured in the volume observation radius during weather observation by setting the weather radar as the volume observation radius where the second trip echo occurs, the weather radar is set as a long-range observation radius in which a second trip echo exceeding the volume viewing radius does not occur. In addition, the second trip echo may be easily removed from the observation information at the volume observation radius based on the simulation echo obtained by simulation a case where the observation echo out of the volume observation radius is shown as the second trip each at the volume observation radius in the observation information obtained through the weather radar set as the long-range observation radius. Further, noise related to the second trip echo occurring in the volume observation radius, which is the radius used in actual use of weather radar, is easily and accurately remove, thereby greatly increasing the accuracy of weather-related observation information in the volume observation radius.

Further, according to the present invention, the second trip echo in the volume observation radius may be simulated based on the correction echo generated by correcting the reflectivity for each altitude angle of the weather radar with respect to the observation echo obtained from the weather radar with the set long-range observation radius and the second trip echo in the volume observation radius may be easily removed as noise based thereon. Therefore, it is possible to greatly improve the observation accuracy of the weather radar in the volume observation radius by removing not only the second trip echo in the horizontal direction but also the second trip echo in the vertical direction.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Hereinafter, detailed embodiments of the present invention will be described with reference to the drawings.

Figure 2:
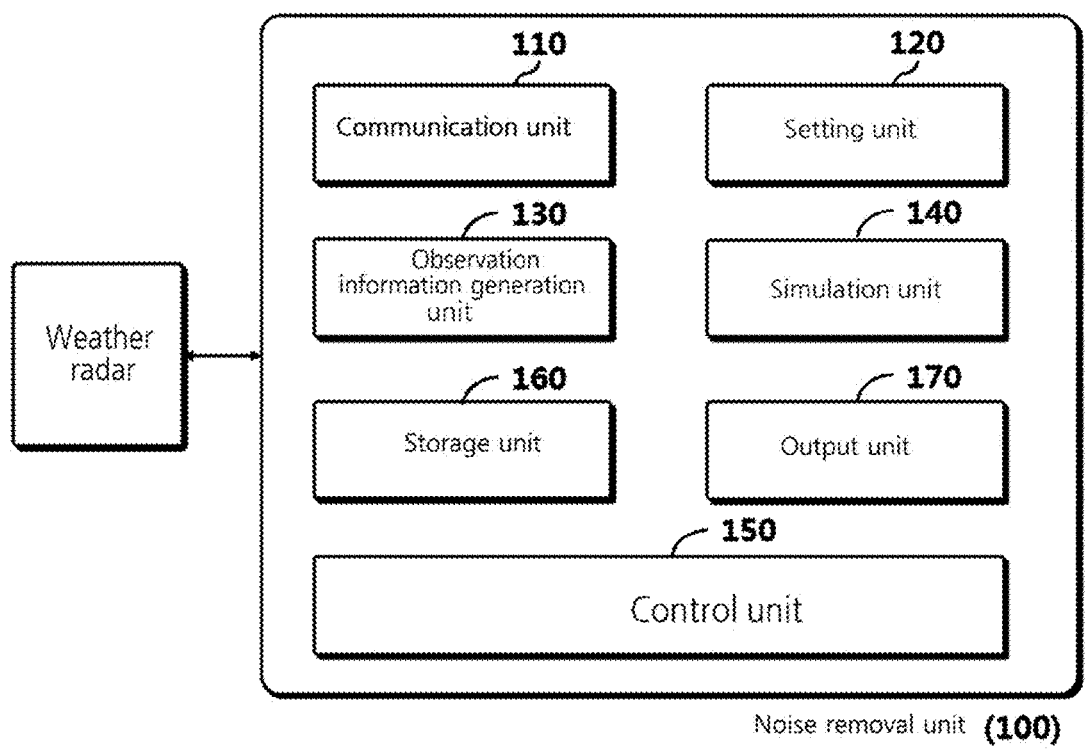
FIG. 2 is a block diagram of an apparatus for removing noise for observation information of a weather radar according to an embodiment of the present invention.
Figure 3:
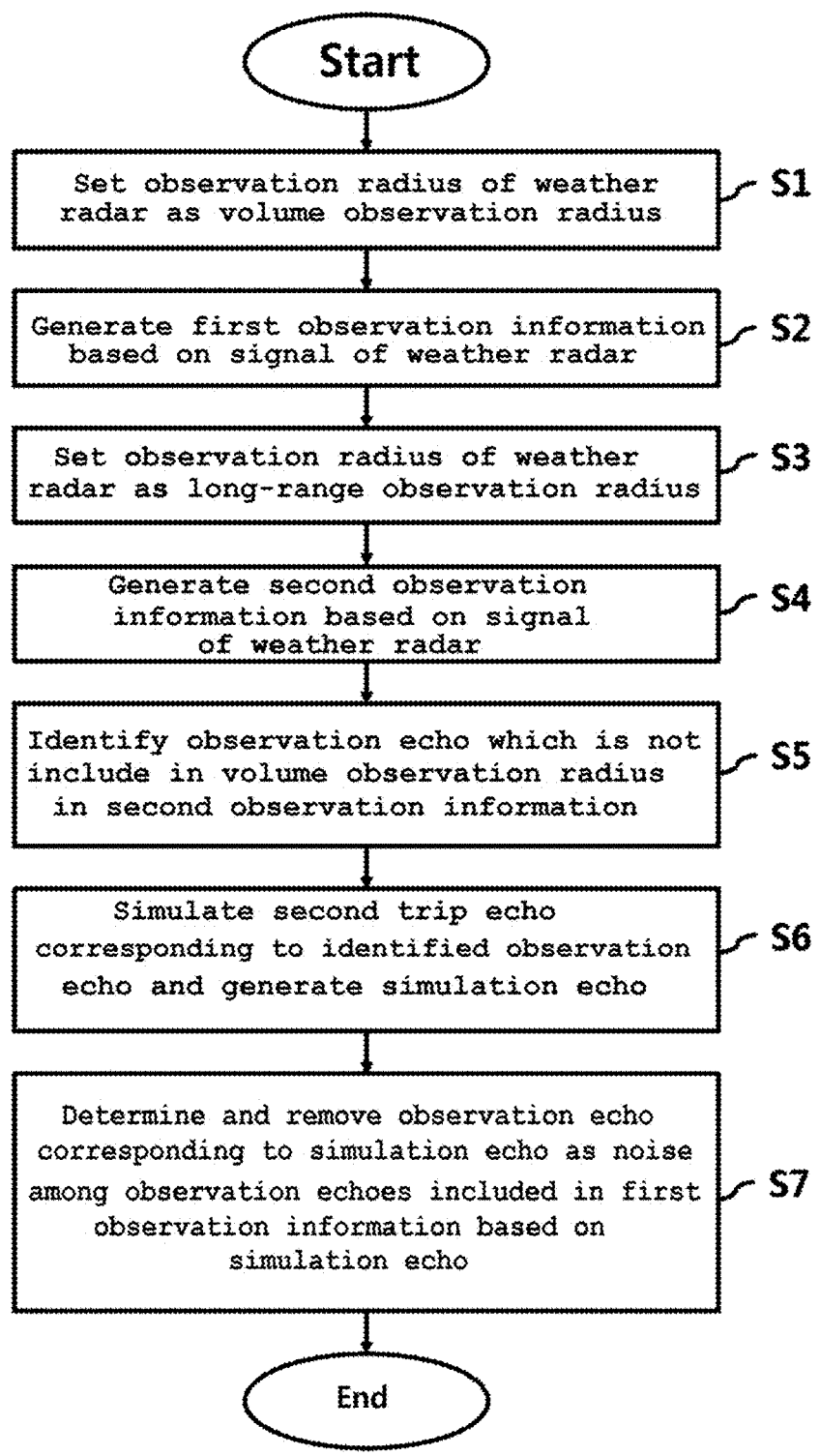
FIG. 3 is a flowchart of a method for removing noise for observation information of a weather radar according to an embodiment of the present invention.

FIG. 2 is a block diagram of an apparatus for removing noise for observation information of a weather radar (hereinafter, a noise removal apparatus) according to an embodiment of the present invention and FIG. 3 is an operational flowchart of the noise removal apparatus.

As illustrated in the drawings, the noise removal apparatus 100 may be configured to include a plurality of components including a communication unit 110 for communicating with a weather radar, a setting unit 120, an observation information generation unit 130, a simulation unit 140, and a control unit 150.

At this time, the noise removal apparatus 100 may be configured by including at least one of the plurality of components in the other component, and for example, the communication unit 110 may be configured to be included in the setting unit 120 or the communication unit 110, the setting unit 120, the observation information generation unit 130, and the simulation unit 140 may be configured to be included in the control unit 150.

In addition, the weather radar may be configured to include a transmitter that generates radio waves (microwaves or radar beams) to be emitted into the atmosphere, an antenna that receives the radio wave reflected from a target by emitting the radio waves generated by the transmitter into the atmosphere, and a receiver that amplifies the radio waves reflected by the target and received through the antenna to transmit the radio waves to the noise removal device 100 as an echo signal. In addition, the weather radar may be configured to include a radome for protecting the antenna and a waveguide through which transmission and reception radio waves move, etc.

In this case, the echo signal may mean a signal generated by the receiver based on the received radio waves, and the target may include various weather elements such as clouds, rain, snow, and hail.

In addition, the echo signal generated by the weather radar based on the radio waves reflected from the target related to the weather such as precipitation is represented as an observation echo such as a precipitation echo in observation information generated by the noise removal apparatus 100.

Hereinafter, the echo represented in the observation information based on the echo signal generated by the weather radar will be described as an observation echo, and the observation echo includes various echoes such as a precipitation echo (or weather echo), a non-precipitation echo (or non-weather echo), and a second trip echo.

Referring to FIGS. 2 and 3, when the detailed operation of each component will be described, the setting unit 120 may communicate with the weather radar to set an observation radius of the weather radar.

In this case, the setting unit 120 may set the observation radius through the control of the control unit 150.

In addition, a plurality of different observation radii set in the weather radar may be preset in the setting unit 120 or the control unit 150.

At this time, the observation radius of the weather radar is determined by a reception time of the radio waves transmitted from the weather radar.

Therefore, as the reception time increases, a temporal resolution of the observation data decreases, so that a volume observation radius, which is an observation radius corresponding to a first reception time (or first reception period) for practical use, which guarantees the observation utility of the weather radar, may be preset in the setting unit 120 or the control unit 150, and the setting unit 120 may set the volume observation radius on the weather radar.

In this case, the setting unit 120 may set the first reception time preset in response to the volume observation radius to the weather radar to set the observation radius of the weather radar as the volume observation radius.

In addition, a long-range observation radius exceeding the volume observation radius may be preset in the setting unit 120 or the control unit 150, and the setting unit 120 may set the long-range observation radius on the weather radar.

In this case, the setting unit 120 may set a second reception time preset in response to the long-range observation radius to the weather radar to set the observation radius of the weather radar as the long-range observation radius.

Figure 1:
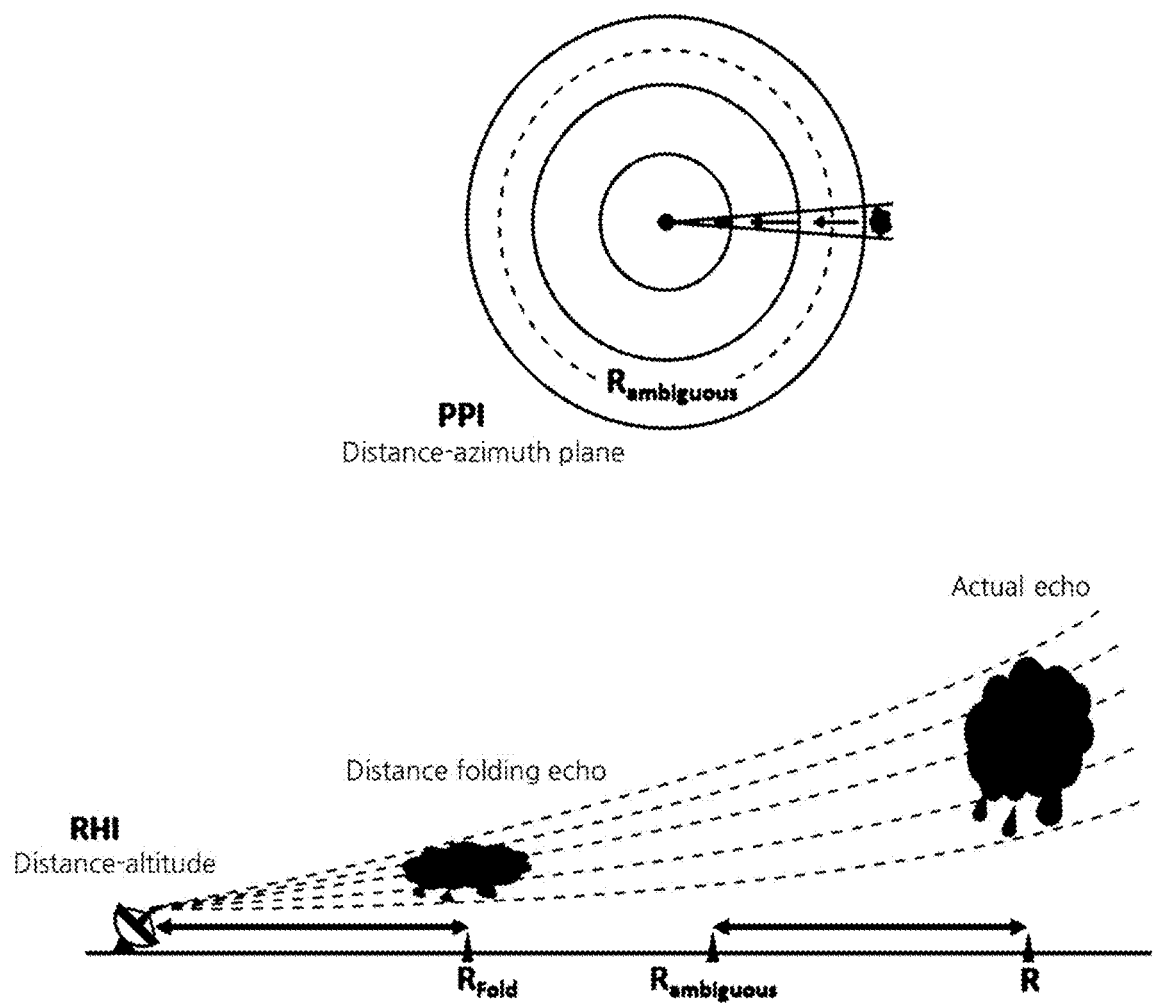
FIG. 1 is an exemplary diagram for a second trip echo caused by distance folding.
Figure 4:
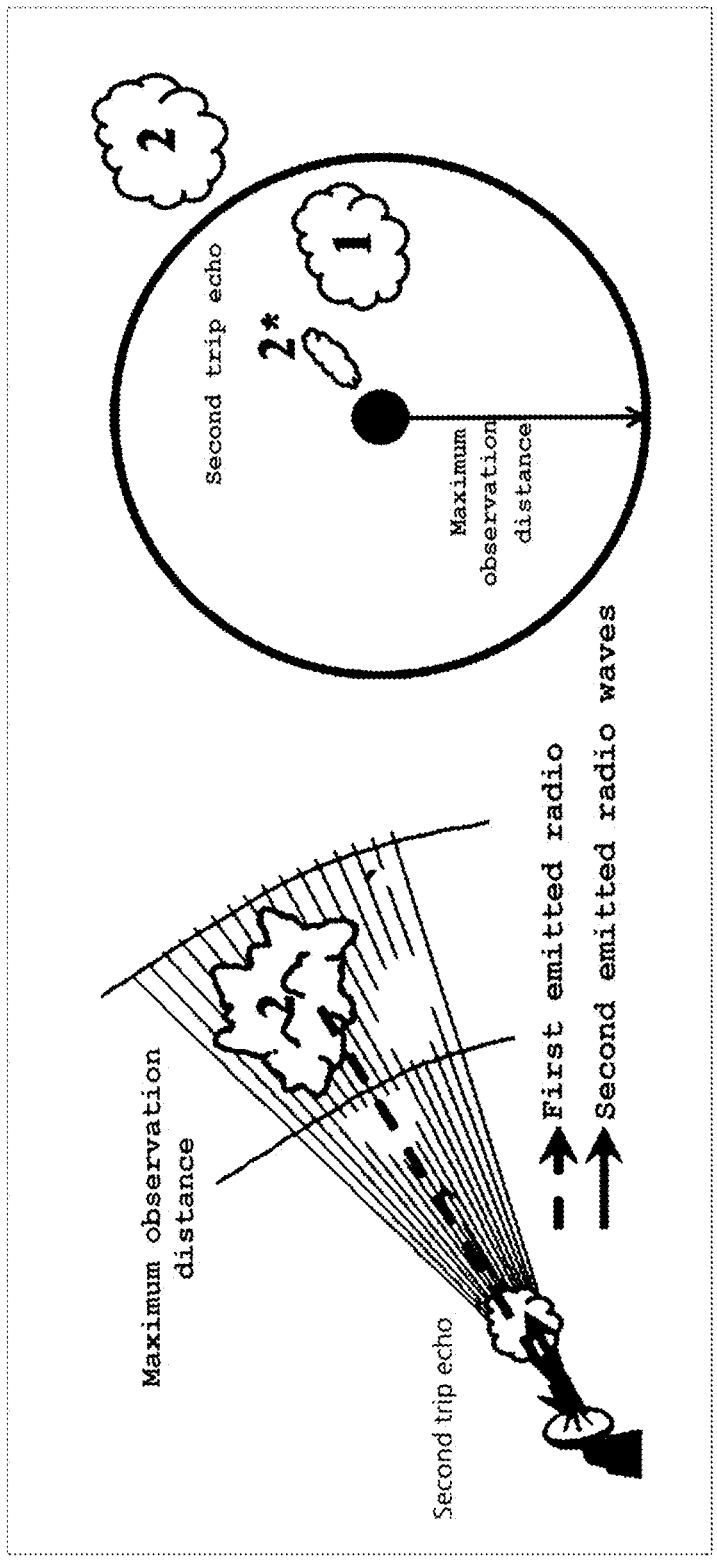
FIG. 4 is an exemplary diagram illustrating a generation form of a second trip echo.

On the other hand, as illustrated in FIGS. 1 and 4, a first radio wave emitted from the weather radar in which the volume observation radius (for example, 240 km in FIG. 4) is set is reflected on a specific target at a distance farther than the volume observation radius to be received to the weather radar as a first reception radio wave. In this case, a time point at which the first reception radio wave is received is not the first reception time (first reception period) when the weather radar receives the first radio wave, but a second reception time (second reception period) for receiving a second reception radio wave corresponding to a second radio wave emitted after the first radio wave from the weather radar.

Therefore, since such a second reception time is a time (period) next to the first reception time, the specific target is shown at a location (2*) close to the weather radar within the volume observation radius other than an original location (2) of the specific target due to distance folding as a second trip echo in the observation information generated by the weather radar in which the volume observation radius is set.

Figure 5:
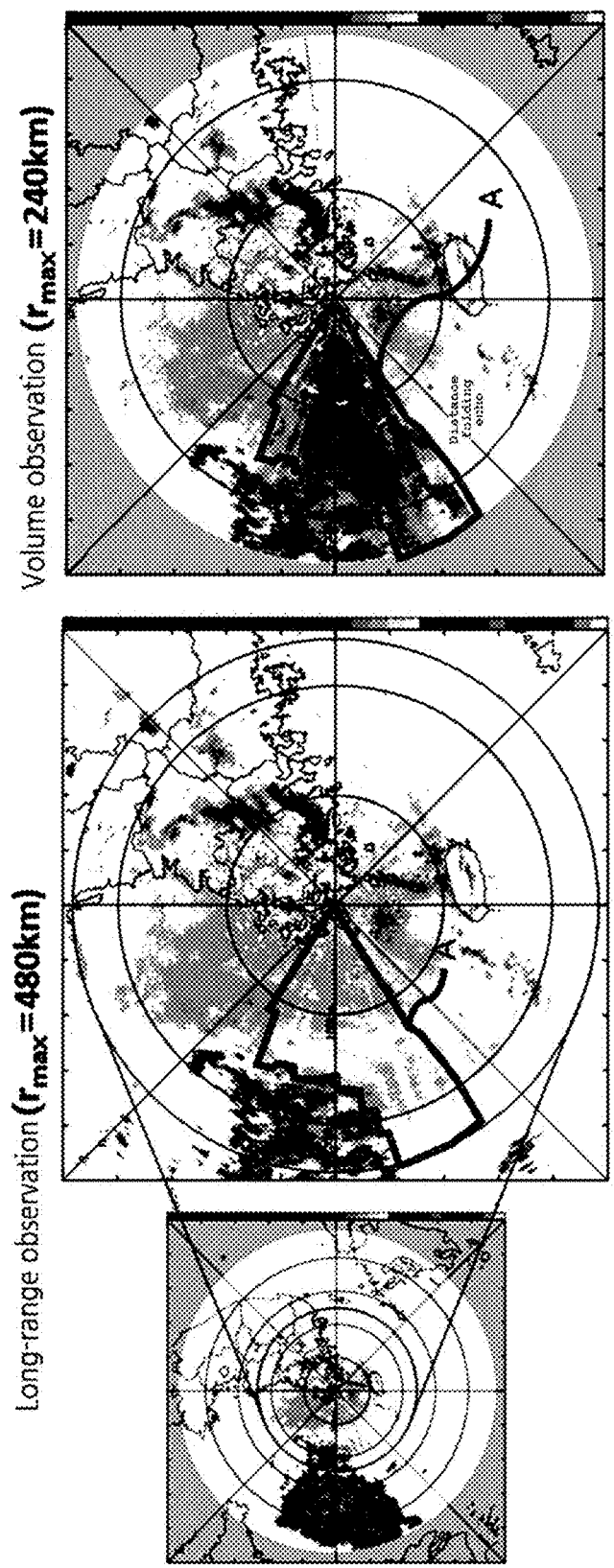
FIGS. 5 and 6 are exemplary diagrams of noise removal through a second trip echo simulation of the apparatus for removing noise for observation information of the weather radar according to the embodiment of the present invention.

FIG. 5 illustrates a first double polarization variable image (hereinafter, first observation information) for reflectivity at a volume observation radius of 240 km and a second double polarization variable image (hereinafter, second observation information) for reflectivity at a long-range observation radius of 480 km, which represent an occurrence case of the above-described second trip echo. In an image at the long-range observation radius in an area A, only a weak non-precipitation echo is observed, but in an image at the volume observation radius in the area A, relatively strong reflectivity is observed in the form of a wedge, and as a result, it can be seen that it is a second trip echo caused by distance folding.

The non-precipitation area may be clearly distinguished from the double polarization variable image of the long-range observation radius, and in the image at the volume observation radius, an observed value of the double polarization variable in the area A where the second trip echo is collected together is similar to that of precipitation rather than non-precipitation.

In other words, in the image at the long-range observation radius where the second trip echo does not occur, the area shown as non-precipitation is shown wrong as a precipitation area in the image at the volume observation radius due to the second trip echo.

That is, the weather radar with the set volume observation radius may provide erroneous information to a target out of the volume observation radius due to the second trip echo.

Accordingly, in order to prevent the effect of the second trip echo, the observation radius of the weather radar may be increased to a long-range observation radius that is a sufficiently long distance in which no second trip echo is shown beyond the volume observation radius.

At this time, even in the long-range observation radius, the observation information may include the second trip echo, but when the long-range observation radius is set far enough, the second trip echo has reflectivity enough to be difficult to be recognized as the target in the long-range observation radius, so that the second trip echo may be prevented or neglected from being shown as a precipitation echo.

In this way, when the radio wave reception time of the weather radar is sufficiently increased to set the long-range observation radius to the weather radar, the reflectivity of the radio waves reflected by the target out of the long-range observation radius is extremely low, and thus, in the long-range observation radius, the second trip echo is not shown in the observation information. However, if the radio wave reception time of the weather radar is increased by the time when the second trip echo is not shown in order to set the long-range observation radius for the weather radar, the observation resolution of the weather radar decreases as described above, and thus practical utility is deteriorated.

Accordingly, in the noise removal apparatus 100 according to an embodiment of the present invention, the observation information shown in such a long-range observation radius is used for removing the noise, which will be described in detail based on the above-described configuration.

First, the observation information generation unit 130 interlocks with the setting unit 120 and may generate first observation information based on a signal received from the weather radar with the set volume observation radius according to setting of the observation radius of the weather radar by the setting unit 120 (S1 and S2).

In addition, the observation information generation unit 130 may generate second observation information based on a signal received from the weather radar in which a long-range observation radius exceeding the volume observation radius is set by interlocking with the setting unit 120 (S3 and S4).

At this time, the observation information generation unit 130 receives the echo signal from the weather radar through the communication unit 110 or the setting unit 120, and processes the echo signal according to a preset signal processing method to generate the first observation information or the second observation information. Here, the first observation information and the second observation information may be binary data, images, or videos including weather-related information, map information (or location information), and the like.

In addition, the noise removal apparatus 100 may further include a storage unit 160, and the observation information generation unit 130 may store the first observation information and the second observation information in the storage unit 160.

In this case, the storage unit 160 may be configured as a DB.

In addition, the long-range observation radius may be a radius in which the second trip echo is not shown (does not occur) or may be double the volume observation radius.

In addition, the first observation information and the second observation information may include an observation echo generated based on the echo signal, and the observation echo may consist of data including reflectivity of the reception radio wave received by reflecting the radio waves transmitted from the weather radar by the target, a location of the target, etc.

In addition, the second trip echo shown in the first observation information may also consist of data including the reflectivity, the location, etc.

Alternatively, the location may be configured to include a latitude, a longitude, a coordinate, and the like.

Based on the above-described configuration, the simulation unit 140 may select and extract the first observation information and the second observation information generated by the observation information generation unit 130 from the storage unit 160 according to the control of the control unit 150 or receive the first observation information and the second observation information from the observation information generation unit 130.

In this case, the first observation information may include information on the volume observation radius, and the second observation information may include information on the long-range observation radius. The simulation unit 140 may identify the observation radius of each of the first observation information and the second observation information.

Further, the simulation unit 140 may generate a simulation echo which simulates a second trip echo corresponding to the observation echo of the second observation information by applying a predetermined simulation algorithm for each observation echo which is not included in the volume observation radius (exists out of the volume observation radius) in the second observation information corresponding to the long-range observation radius in which the second trip echo is not shown or is not identified as the target (S5 and S6).

That is, the simulation unit 140 may simulate a second trip echo that may be shown in the first observation information for an observation echo existing out of the volume observation radius in the second observation information, and generate a simulation echo through this simulation.

For example, the simulation unit 140 may generate a simulation echo which simulates a second trip echo corresponding to the identified observation echo by applying the identified observation echo to the simulation algorithm whenever an observation echo which is not located in the volume observation radius (at a distance farther than the volume observation radius) is identified among one or more observation echoes included in the second observation information. Through this, the simulation unit 140 may simulate the second trip echo corresponding to the location in the volume observation radius for the identified observation echo.

That is, the simulation unit 140 may generate a simulation echo simulated by assuming the time when the observation echo shown in the second observation information is shown as the second trip echo in the first observation information by a distance folding in the volume measurement radius.

In the above-described configuration, the simulation algorithm may be configured to include the following Equations 1 to 4 (or first to fourth Equations).

Equation 1 (first equation) is as follows.

$$P_r = c \frac{z}{r^2} \quad \text{[Equation 1]}$$

Wherein, c represents a radar constant, z represents reflectivity, $P_r$ represent reception power, and r represents an observation distance.

In addition, Equation 2 (second Equation) is as follows.

$$P_r \propto \tau \quad \text{[Equation 2]}$$

Wherein, $P_r$ represents reception power, and $\tau$ represents a pulse width.

In addition, Equation 3 (third Equation) is as follows.

$$dBZ_{Folding}(r_{Folding}) = \\ 10\log_{10}\left[10^{(dBZ_{Folded}(r_{Folded})/10.0)} \times \frac{\tau_{Folding}}{\tau_{Folded}} \times \frac{r^2_{Folding}}{r^2_{Folded}}\right] \quad \text{[Equation 3]}$$

Wherein, $dBZ_{Folding}$ represents a simulation reflection, $r_{Folding}$ represents a distance to be simulated, $\tau_{Folding}$ represents a simulated pulse width, $r_{Folded}$ represents a long-range observation radius, $dBZ_{Folded}$ represents reflectivity at the long-range observation radius (simulated true value), and $\tau_{Folded}$ represents a pulse width of the radio wave in the long-range observation radius.

In addition, Equation 4 (fourth Equation) is as follows.

$$\text{Simulated true location} = r + r_{ambiguous} + r_{Blind}, \quad \text{[Equation 4]}$$

In the simulated true location (actual location)= $r + r_{ambiguous} + r_{Blind}$ according to Equation 4, the $r_{ambiguous}$ represents a maximum reception distance of the simulation setting (determined by a pulse repetition frequency (PRF) of the simulation setting), and $r_{Blind}$ represents a reception blank due to transmission in the simulation setting (determined by a pulse width of the simulation setting).

When a hydrometeor having arbitrary reflectivity (z) in an observation volume of an arbitrary distance (r) is observed as shown in Equation 1, the power $P_r$ received by the radar is inversely proportional to the square of the distance.

That is, the observation information generation unit 130 calculates logarithmic reflectivity (dBZ=10 log 10(z)) from the received power in consideration of an observation distance along with a radar constant determined according to an observation setting.

In addition, since the received power is proportional to the pulse width of the radio wave set at the time of observation, as shown in Equation 2, when the pulse width set when observing the data that is the true value of the simulation is different from the pulse width of the observation setting to be simulated, a difference in pulse width should also be considered.

In addition, when the distance folding for the volume observation radius is simulated using the second observation information, which is reflectivity-related data collected as a long-range observation radius, the values obtained through Equations 1 and 2 and the reflectivity of the second trip echo for any location through Equations 3 and 4 are estimated. Since the second trip echo is treated as closer than an actual echo distance, the reflectivity is calculated weaker than the actual echo, and is shown in a wedge shape toward the center of the radar due to the observational characteristics of a polar coordinate system.

Meanwhile, the control unit 150 executes an overall control function of the noise removal apparatus 100 using programs and data stored in the storage unit 160. The control unit 150 may include a RAM, a ROM, a CPU, a GPU, and a bus, and the RAM, the ROM, the CPU, and the GPU may be connected to each other via a bus.

In addition, the control unit 150 may determine and remove the observed echo corresponding to the simulated echo as noise among one or more observation echoes included in the first observation information based on the simulation echo simulated through the simulation unit 140 (S7).

As an example, the control unit 150 compares the reflectivity between the second trip echo simulated at a specific location (a specific simulation echo) and a specific observation echo corresponding to the specific location in the second observation information. Then, when the reflectivity of the specific simulation echo is greater than the reflectivity of the specific observation echo, the control unit 150 may perform determination of the second trip echo in which the specific observation echo is determined as the second trip echo.

In addition, the control unit 150 may calculate a performance result by performing the determination of the second trip echo for each of the one or more simulation echoes received from the simulation unit 140, and remove noise from the first observation information based on the simulation echo included in the performance result.

In this case, the performance result may include information on one or more simulation echoes determined as the second trip echo.

In addition, when one or more observation echoes are present in the first observation information, the control unit 150 may identify a location according to a simulation echo determined as a second trip echo through the performance result among one or more observation echoes included in the first observation information, from the first observation information. Then, the control unit 150 may determine the observation echo present at the location identified in response to the simulation echo determined as the second trip echo among the observation echoes included in the first observation information as the noise corresponding to the second trip echo to remove the determined noise from the first observation information.

In the above configuration, the control unit 150 may control the setting unit 120 during observation using the weather radar to alternately set the first reception time for the volume observation radius and the second reception time for the long-range observation radius on the weather radar.

That is, the control unit 150 may alternately set the volume observation radius and the long-range observation radius in the weather radar through the setting unit 120.

For example, the control unit 150 may count a time from the time point when the first reception time is set on the weather radar through the setting unit 120 and then change the reception time of the weather radar into the second reception time through the setting unit 120 to change the observation radius of the weather radar into the long-range observation radius, when the first reception time is terminated and the observation of the weather radar for the volume observation radius is terminated.

In addition, the control unit 150 may count a time from the time point changed to the second reception time and then change the observation radius of the weather radar into the volume observation radius through the setting unit 120 again to set alternately the volume observation radius and the long-range observation radius on the weather radar, when the second reception time is terminated and the observation of the weather radar for the long-range observation radius is terminated.

At this time, since a data collection time interval between the volume observation radius and the long-range observation radius is short within 1 to 2 minutes, the control unit 150 may observe the observation echo at almost the same time.

Accordingly, the control unit 150 controls the observation information generation unit 130 to generate first observation information corresponding to the volume observation radius and second observation information corresponding to the long-range observation radius at a predetermined period, match each other and then store the information in the storage unit 160.

In this case, the control unit 150 may receive the first observation information and the second observation information from the observation information generation unit 130 and temporarily store the information in the control unit 150.

In addition, the control unit 150 controls the simulation unit 140 to identify first observation information matched at the same period with second observation information corresponding to the simulation echo generated by the simulation unit 140 and remove noise from the identified first observation information based on the simulation echo as described above.

For example, the control unit 150 may match and store first observation information generated based on a signal received from the weather radar set as the volume observation radius for a specific altitude angle (or the same altitude angle or a single altitude angle) with second observation information received from the weather radar set as the long-range observation radius for the specific altitude angle after setting the volume observation radius as information corresponding to one period.

Accordingly, the control unit 150 may identify first observation information and the second observation information that are matched with each other, provide second observation information of the first observation information and the second observation information that are matched with each other to receive a simulation echo simulated using the second observation information from the simulation unit 140. Then, the control unit 150 may remove noise which is the second trip echo as described above based on the simulation echo from the first observation information matched with the second observation information corresponding to the simulation echo.

Meanwhile, the noise removal apparatus 100 may further include an output unit 170 that outputs at least one of the first observation information and the second observation information.

Accordingly, the control unit 150 may output and display the first observation information from which the noise has been removed through the output unit 170.

In this case, the control unit 150 may output and display the first observation information and the second observation information through the output unit 170.

Figure 6:
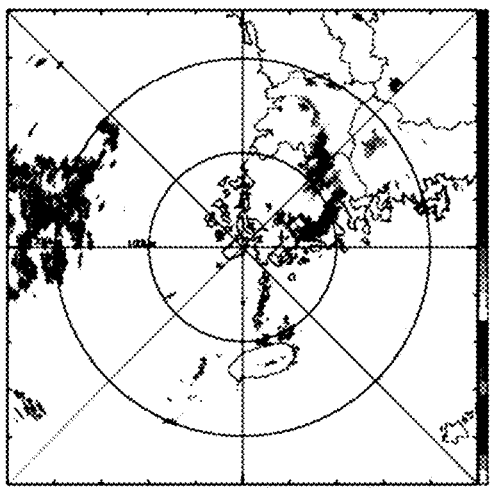
Figure 6:
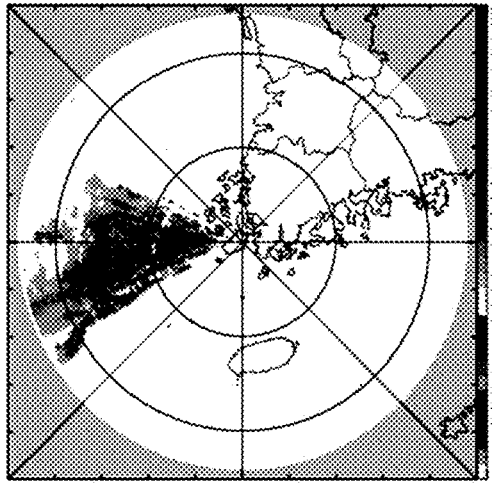
Figure 6:
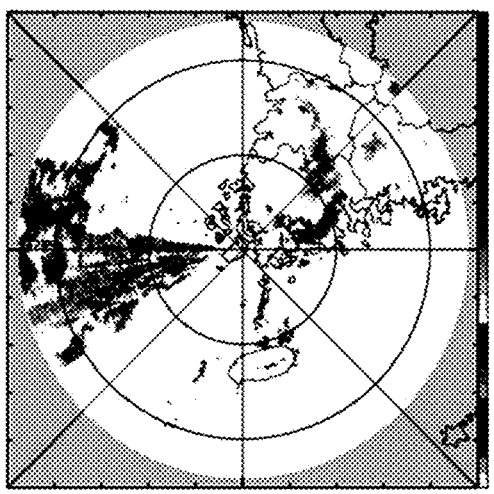
Figure 6:
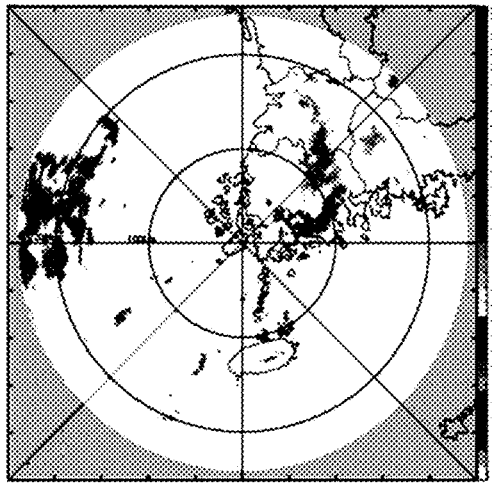

FIG. 6 is a diagram illustrating an operation of removing noise in the noise removal apparatus 100 as described above.

First, the noise removal apparatus 100 may simulate a second trip echo in the volume observation radius as illustrated in FIG. 6B using second observation information at a long-range observation radius as illustrated in FIG. 6A to generate the simulation echo.

Accordingly, the noise removal apparatus 100 may identify and remove the second trip echo as noise as described above based on the simulation echo from the first observation information corresponding to the second observation information and at the same altitude angle as the second observation information as illustrated in FIG. 6C to obtain the first observation information from which the noise (second trip echo) is removed as illustrated in FIG. 6D.

As described above, according to the present invention, in order to remove the second trip echo that occurs in the observation information measured in the volume observation radius during weather observation by setting the weather radar as the volume observation radius where the second trip echo occurs, the weather radar is set as a long-range observation radius in which a second trip echo exceeding the volume observation radius does not occur. In addition, the second trip echo may be easily removed from the observation information at the volume observation radius based on the simulation echo obtained by simulation a case where the observation echo out of the volume observation radius is shown as the second trip each at the volume observation radius in the observation information obtained through the weather radar set as the long-range observation radius. Further, noise related to the second trip echo occurring in the volume observation radius, which is the radius used in actual use of weather radar, is easily and accurately remove, thereby greatly increasing the accuracy of weather-related observation information in the volume observation radius.

In addition, the noise removal apparatus 100 performs the observation through the weather radar in the long-range observation radius immediately after observation is performed through the weather radar in the volume observation radius. Based on the simulation echo obtained using the observation information obtained from the long-range observation radius within a short time from the time point of obtaining the observation information for the volume observation radius, noise may be immediately removed from the observation information corresponding to the volume observation radius and provided. It is possible to increase the efficiency of noise removal of the observation information while increasing the accuracy of the observation information.

Meanwhile, the above-described configuration has been described for the method of removing the second trip echo at the same altitude (or the same altitude angle), and the noise removal apparatus 100 according to the embodiment of the present invention may easily remove the second trip echo for each altitude shown in the first observation information while changing the altitude angle of the weather radar, which will be described in detail.

First, the storage unit 160 may pre-store a vertical profile obtained by modeling a plurality of different altitude angles that change in a vertical direction whenever the altitude angle of the weather radar is changed and changes in reflectivity (of an echo signal) between the plurality of different altitude angles corresponding thereto.

For example, the control unit 150 sets the weather radar as a long-range observation radius through the setting unit 120 and then collect reflectivity for each of the plurality of different altitudes according to a change in altitude angle based on the echo signal received from the weather radar for the same target while changing the altitude angle of the weather radar through the setting unit 120. In addition, the control unit 150 may generate a vertical profile obtained by modeling changes in reflectivity between the plurality of different altitudes (altitude angles) by averaging the collected reflectivity (or measurements) for each of the plurality of different altitude angles or performing statistical analysis and store the vertical profile in the storage unit 160.

Accordingly, the control unit 150 corrects reflectivity for each of the plurality of different altitudes for each of the observation echoes out of the volume observation radius included in the second observation information for each different altitude angle according to the vertical profile to calculate one or more correction echoes in which the reflectivity is corrected for each altitude.

In addition, the control unit 150 applies each of the one or more correction echoes corresponding to a specific observation echo to a simulation algorithm through the simulation unit 140 by interlocking with the simulation unit 140 to generate one or more simulation echoes corresponding (one-to-one) to each of the one or more correction echoes and remove the observation echo corresponding to the simulation echo as noise from the first observation information as described above based on the one or more generated simulation echoes.

That is, the control unit 150 may obtain a simulation echo that simulates a second trip echo for the observation echo for which the reflectivity for each altitude angle is corrected by interlocking with the simulation unit 140 and remove the observation echo corresponding to the simulation echo as noise for each altitude angle different from the long-range observation altitude angle from the first observation information.

In this case, the simulation echo simulated based on the correction echo may further include data on not only the location but also the observation altitude (or observation altitude angle), thereby easily removing the observation echo corresponding to the location and the altitude (altitude angle) of the simulation echo simulated based on the correction echo from the first observation information.

Figure 7:
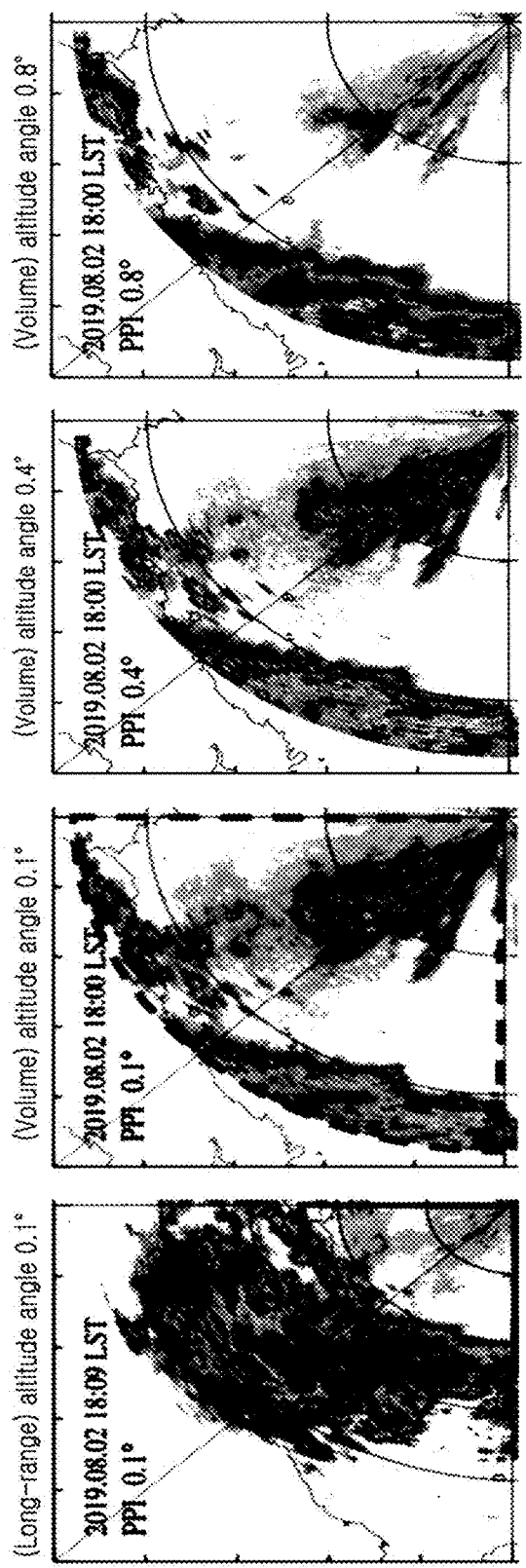
FIGS. 7 to 9 are exemplary diagrams of noise removal related to second trip echo simulations according to extended application of altitude angles in the apparatus for removing noise for observation information of the weather radar according to the embodiment of the present invention.

As an example of this, since the reflectivity of the observation echo (e.g., a precipitation echo) generally decreases as the altitude increases, as illustrated in FIG. 7, the second trip echo (simulation echo) simulated therefrom may gradually decrease in the area and the reflectivity up to an altitude angle of about 1.5°.

In order to eliminate this problem, if the long-range observation using the weather radar according to the long-range observation radius is performed at each altitude angle, the temporal resolution of volume data may be greatly degraded as the data collection time increases.

In order to ensure adequate data collection intervals while effectively eliminating second trip echoes for higher elevation angles, the noise removal apparatus 100 may perform long-range observation of a single low-rise altitude angle, and simulate a second trip echo of the vertical altitude angle through altitude correction using a vertical profile of reflectivity.

Figure 8:
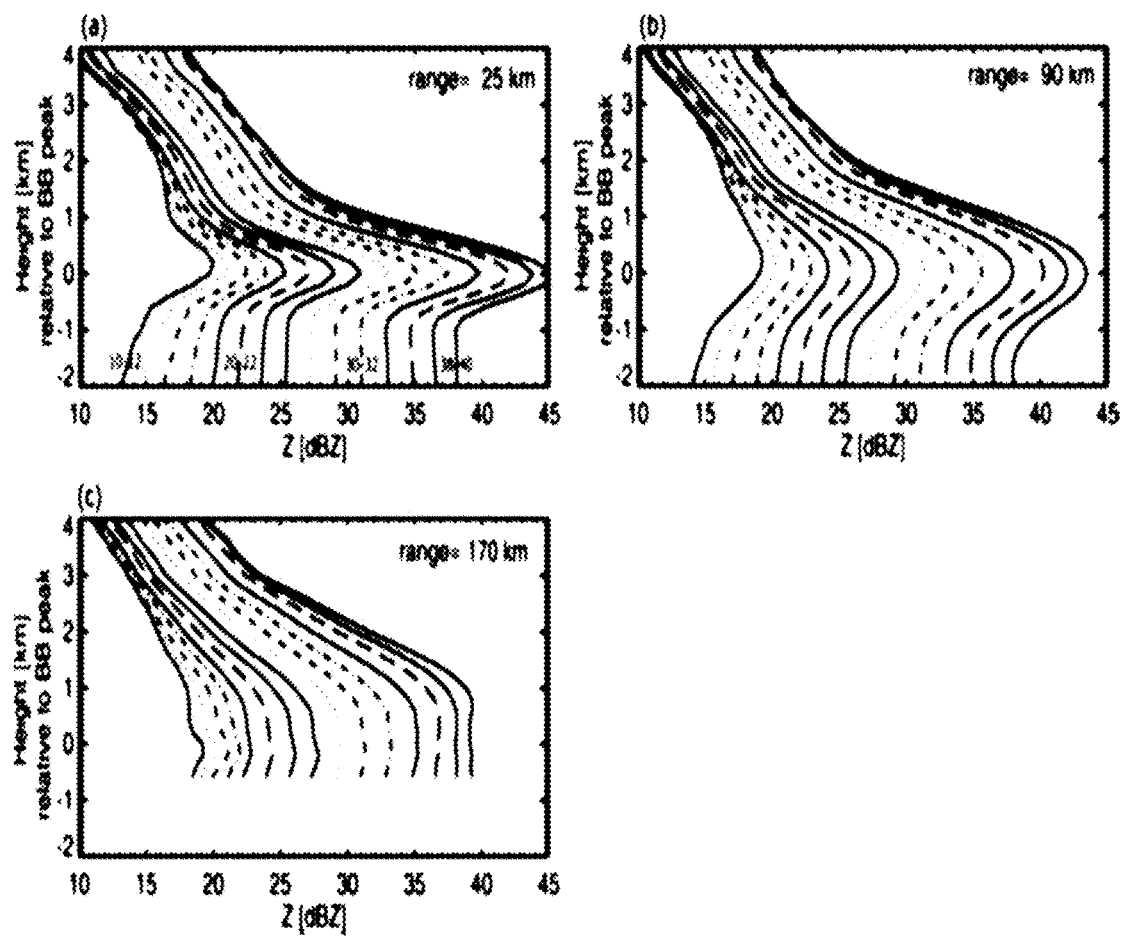

FIG. 8 illustrates an average vertical profile of reflectivity proposed by Bellon et al. (2004), and in this study, it is shown that a stratiform profile with a peak at a specific altitude is observed as a monotonic reduction (similar to convective precipitation) compared to an actual profile as the observation distance increases by simulating an effect in which a radar beam width is extended according to a distance.

It is meant that when a vertical reflectivity profile is used to simulate the second trip echo for radar observation data of 170 km or more, it is effective to apply a monotonically reduced average profile similar to that of convective precipitation even in a stratiform precipitation region.

Figure 9:
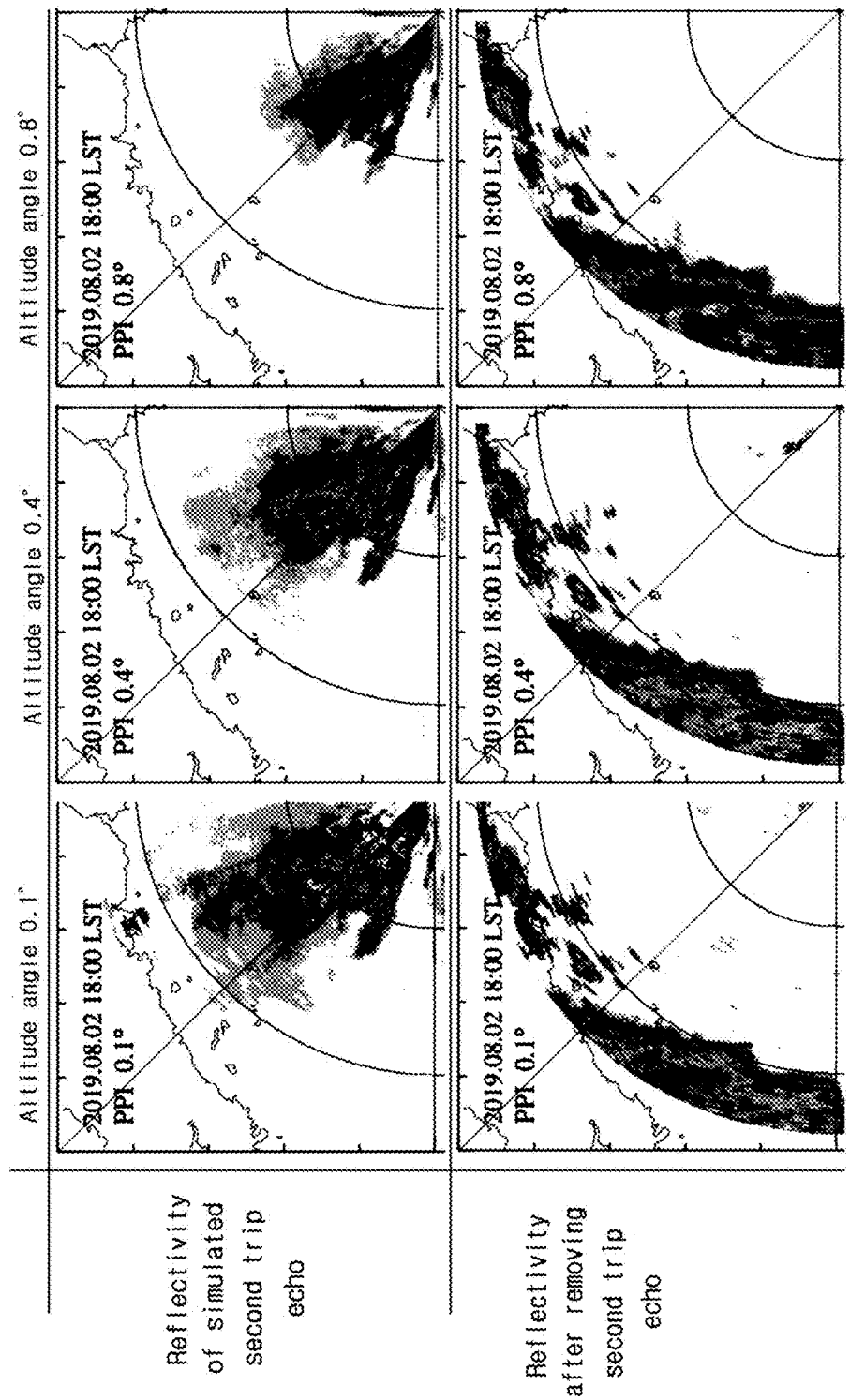

FIG. 9 is an exemplary diagram illustrating noise removal through a second trip echo simulation using a vertical profile of the noise removal apparatus 100. As illustrated in FIG. 9, if the vertical profile is set as a function of reflectivity and altitude or a value for each section, one profile is determined according to the altitude for each observation point out of the volume observation radius and the reflectivity at the long-range observation radius, and the corrected reflectivity for the altitude of each observation point of the altitude angle data to be simulated may be obtained according to the corresponding profile.

When simulating a second trip echo using the above method with respect to highly corrected reflectivity, with respect to a high altitude angle of the long-range observation altitude angle (0.1°), as illustrated in FIG. 9, the second trip echo that is decreased as the altitude angle increases may be appropriately simulated. By using this, noise may be easily removed by identifying the second trip echo from the first observation information.

As described above, according to the present invention, the second trip echo in the volume observation radius may be simulated based on the correction echo generated by correcting the reflectivity for each altitude angle of the weather radar with respect to the observation echo obtained from the weather radar with the set long-range observation radius and the second trip echo in the volume observation radius may be easily removed as noise based thereon. Therefore, it is possible to greatly improve the observation accuracy of the weather radar in the volume observation radius by removing not only the second trip echo in the horizontal direction but also the second trip echo in the vertical direction.

Various apparatuses and components described in the present specification may be embodied by a hardware circuit (for example, a CMOS based logic circuit), firmware, software, or combinations thereof. For example, the apparatuses and components may be embodied by using a transistor, a logic gate, and an electronic circuit in the forms of various electric structures.

The aforementioned contents can be corrected and modified by those skilled in the art without departing from the essential characteristics of the present invention. Accordingly, the various embodiments disclosed in the present invention are not intended to limit the technical spirit but describe the present invention and the technical spirit of the present invention is not limited by the following embodiments. The protection scope of the present invention should be construed based on the following appended claims and it should be appreciated that the technical spirit included within the scope equivalent to the claims belongs to the present invention.

What is claimed is:

1. An apparatus for removing noise for observation information of a weather radar, the apparatus comprising:
one or more processors;
memory coupled to the one or more processors and configured to store instructions, which, when executed by the one or more processors, causes the one or more processors to perform operations comprising:
setting an observation radius of the weather radar by alternating a volume observation radius and a long-range observation radius;
generating first observation information including an observation echo based on an echo signal received from the weather radar in which the volume observation radius is and generating second observation information including the observation echo based on the echo signal received from the weather radar in which the long-range observation radius exceeding the volume observation radius is set, the echo signal being generated based on a radio wave reflected from a target, the observation echo including a location of the target;
generating a simulation echo by applying a predetermined simulation algorithm for each observation echo out of the volume observation radius in the second observation information to simulate a second trip echo corresponding to the observation echo of the second observation information; and
determining and removing an observation echo corresponding to the simulation echo among one or more observation echoes included in the first observation information as noise based on the simulation echo.

2. The apparatus of claim 1, wherein the observation echo and the second trip echo each consists of data including reflectivity and a location.

3. The apparatus of claim 2, wherein the determining and removing the observation echo corresponding to the simulation echo includes:
comparing a reflectivity of a specific simulation echo simulated at a specific location and a reflectivity of a specific observation echo corresponding to the specific location in the second observation information;
performing determination of the second trip echo in which the specific observation echo is determined as the second trip echo when the reflectivity of the specific simulation echo is greater than the reflectivity of the specific observation echo;
calculating a performance result by performing the determination of the second trip echo for each of the one or more simulation echoes; and
removing noise from the first observation information based on a simulation echo included in the performance result.

4. The apparatus of claim 1, the operations further comprising:
outputting at least one of the first observation information and the second observation information, the noise being removed from the first observation information.

5. The apparatus of claim 1, wherein the long-range observation radius is a radius in which a second trip echo is not shown or which is double the volume observation radius.

6. The apparatus of claim 1, wherein the simulation algorithm includes first to fourth Equations,
the first Equation is $$P_r = c\frac{z}{r^2},$$

wherein, c represents a radar constant, z represents reflectivity, $P_r$ represent reception power, and r represents an observation distance,
the second Equation is $$P_r \propto \tau,$$

wherein, $P_r$ represents reception power, and $\tau$ represents a pulse width,
the third Equation is $$dBZ_{Folding}(r_{Folding}) = 10\log_{10}\left[10^{(dBZ_{Folded}(r_{Folded})/10.0)} \times \frac{\tau_{Folding}}{\tau_{Folded}} \times \frac{r^2_{Folding}}{r^2_{Folded}}\right],$$

wherein $dBZ_{Folding}$ represents simulation reflectivity, $r_{Folding}$ represents a distance to be simulated, $\tau_{Folding}$ represents a simulated pulse width, $r_{Folded}$ represents a long-range observation radius, $dBZ_{Folded}$ represents reflectivity at the long-range observation radius, and $\tau_{Folded}$ represents a pulse width of the radio wave in the long-range observation radius,
the fourth Equation is simulated true location(actual location)=$r+r_{ambiguous}+r_{Blind}$, wherein $r_{ambiguous}$ represents a maximum reception distance of the simulation setting and $r_{Blind}$ represents a reception blank due to transmission in the simulation setting.

7. The apparatus of claim 1, further comprising:
a storage unit that pre-stores a vertical profile obtained by modeling a plurality of different altitude angles that are changed in a vertical direction whenever an altitude angle of the weather radar is changed and changes in reflectivity between the plurality of different altitude angles corresponding thereto,
wherein the determining and removing the observation echo corresponding to the simulation echo includes:
correcting reflectivity for each of the plurality of different altitudes for each of observation echoes out of the volume observation radius in the second observation information for each different altitude angle according to the vertical profile to calculate one or more correction echoes in which the reflectivity is corrected for each altitude,
applying each of the one or more correction echoes obtained corresponding to a specific observation echo to the simulation algorithm to generate one or more simulation echoes corresponding to each of the one or more correction echoes, and then
removing the noise from the first observation information based on the one or more generated simulation echoes.

8. The apparatus of claim 1, wherein the operations further comprise:
alternately setting the volume observation radius and the long-range observation radius in the weather radar;
generating first observation information corresponding to the volume observation radius and second observation information corresponding to the long-range observation radius at flail predetermined periods to match each other;

identifying first observation information matched at a same period with second observation information corresponding to the simulation echo; and removing the noise from the identified first observation information based on the simulation echo.

9. A computer implemented method for removing noise for observation information of a weather radar by a noise removal apparatus, the method comprising the steps of:

generating first observation information including an observation echo based on an echo signal received from the weather radar by setting an observation radius of the weather radar as a predetermined volume observation radius, the echo signal being generated based on a radio wave reflected from a target, the observation echo including a location of the target;

generating second observation information including the observation echo based on the echo signal received from the weather radar by setting the observation radius of the weather radar as a predetermined long-range observation radius exceeding the volume observation radius;

generating a simulation echo by applying a predetermined simulation algorithm for each observation echo out of the volume observation radius in the second observation information to simulate a second trip echo corresponding to the observation echo of the second observation information; and determining and removing an observation echo corresponding to the simulation echo among one or more observation echoes included in the first observation information as noise based on the simulation echo.

* * * * *